Patented June 1, 1926.

1,587,408

UNITED STATES PATENT OFFICE.

LELAND L. ODOM, OF MEMPHIS, TENNESSEE, ASSIGNOR OF ONE-THIRD TO E. M. ELLIS, OF MEMPHIS, TENNESEE, AND ONE-THIRD TO J. D. REYNOLDS, OF CAMDEN, ARKANSAS.

PROCESS FOR REMOVING SULPHUR FROM VULCANIZED RUBBER.

No Drawing. Application filed January 7, 1925. Serial No. 1,101.

My invention relates to the treatment of vulcanized rubber, trimmings and rubber scrap material, and has for its principal object the provision of a new and improved process for the removal of sulphur from such material.

Another object of the invention is the provision of such a process wherein rubber in its pre-vulcanized state is recovered.

With these, and such other objects in view as will be apparent from the description to those skilled in the art, my invention resides in the novel process and treatment hereinafter described and claimed.

At the present time the removal of sulphur from vulcanized rubber is one of the greatest unsolved problems confronting the rubber industry. Many processes for accomplishing this result have been tried, and many attempts have been made, but none have proved practical, and have been commercially abandoned. The known methods usually embrace an acid or alkaline treatment as solvents, efforts having been made to split off the sulphur atom in the vulcanized molecule, reducing it back to an unsaturated hydrocarbon condition, to bring the original hydrocarbon into a form capable of the same degree of vulcanization it possessed before vulcanization.

The formula for caoutchouc is $C_{10}H_{16}$ and that of vulcanized rubber $C_{10}H_{16}S_2$. Due to the complex condition of rubber and the very strong affinity for sulphur, it is not possible by known methods to dissolve the vulcanized rubber, effect a combination of the sulphur and solvent and evaporate off to recover unvulcanized rubber. Many attempts have been made, but any known reagents that are powerful enough to remove the combined sulphur, render the rubber unfit for commercial use.

The essential principle of my process lies in a splitting of the caoutchouc molecules of the vulcanized rubber with accompanying removal of the sulphur atoms, and a reuniting of the split molecules to original form after sulphur removal.

Caoutchouc, $C_{10}H_{16}$, when its molecules are split, resolves into $2C_5H_8$, which is isoprene. Isoprene when placed over metallic sodium, undergoes polymerization forming caoutchouc. In order to make use of this action, it is necessary at some point to remove the sulphur atom in the treatment of vulcanized rubber.

I accomplish this result by distilling vulcanized rubber in a still which is heated by superheated steam, through metallic wool. In the passage of the still vapor through the wool, the affinity of sulphur for the metal is so strong that it will leave the caoutchouc and combine with the metal; and the heat of the still causing a splitting of the caoutchouc molecule, the resulting distillate will be isoprene free of sulphur.

The liquid distillate, isoprene, is then placed over metallic sodium and polymerizes, forming caoutchouc. The formula is as follows;

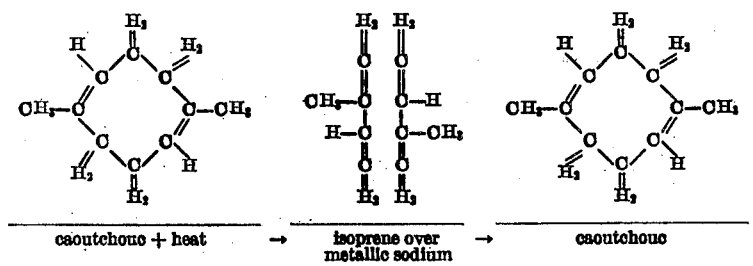

caoutchouc + heat → isoprene over metallic sodium → caoutchouc

The vulcanized rubber may either be distilled directly through the metallic wool, or the distillate may be redistilled through the wool, as is most practicable. I have found that copper wool gives best results, but steel, iron, and many other metals may be employed.

An important result in my process lies in the recovery of fabric material incorporated in such material as old tires and the like treated for the recovery of rubber. By using superheated steam, the fabric material is preserved in its original state, as the rubber is distilled away. All other known processes destroy the fabrics by use of acids or alkalis.

I have found that best results are obtained in polymerization, by using one part metallic sodium to twenty parts isoprene, and these proportions are embodied in my process.

While I have described certain steps and details as well as materials entering into the invention, I desire it to be understood that the invention is not limited thereto, but that any desired changes and modifications may be made as will fall within the scope of the invention as claimed.

I claim:—

1. In a process for removing sulphur from vulcanized rubber, the distillation of such rubber through metallic wool to produce isoprene.

2. A process for the treatment of material containing vulcanized rubber, comprising distilling said material through a substance having a stronger affinity for sulphur than the rubber of the material, said substance being under heat.

In testimony whereof I affix my signature.

LELAND L. ODOM.